(12) United States Patent
Taivalsaari

(10) Patent No.: US 7,328,432 B2
(45) Date of Patent: Feb. 5, 2008

(54) PROXIMITY-BASED ADDRESSING FOR SUPPORTING IN-PLACE EXECUTION IN VIRTUAL MACHINES

(75) Inventor: Antero K. P. Taivalsaari, Siivikkala (FI)

(73) Assignee: Sun Microsystems, Inc., Santa Clara, CA (US)

( * ) Notice: Subject to any disclaimer, the term of this patent is extended or adjusted under 35 U.S.C. 154(b) by 980 days.

(21) Appl. No.: 10/453,941

(22) Filed: Jun. 2, 2003

(65) Prior Publication Data

US 2004/0243999 A1    Dec. 2, 2004

(51) Int. Cl.
*G06F 9/45* (2006.01)
*G06F 9/455* (2006.01)

(52) U.S. Cl. .......................................... 717/148; 718/1
(58) Field of Classification Search ................ 719/310; 717/148; 718/1
See application file for complete search history.

(56) References Cited

U.S. PATENT DOCUMENTS

| | | | | |
|---|---|---|---|---|
| 5,581,768 | A | 12/1996 | Garney et al. ............... | 395/674 |
| 5,815,718 | A | 9/1998 | Tock ........................... | 395/705 |
| 5,920,720 | A * | 7/1999 | Toutonghi et al. .......... | 717/148 |
| 7,159,223 | B1 * | 1/2007 | Comeau ...................... | 719/310 |
| 2002/0053072 | A1 * | 5/2002 | Steinbusch et al. ......... | 717/148 |
| 2002/0069342 | A1 | 6/2002 | Ginsberg ..................... | 711/209 |

OTHER PUBLICATIONS

Nik Shaylor, Douglas N. Simon, William R. Bush: "A java virtual machine architecture for very small devices" Proceedings of the 2003 ACM SIGPLAN Conference on Language; Compiler and Tool for Embedded Systems, 'Online! Jun. 11, 2003, XP002338016 San Diego, California, Etats-Unis d' Amerique Retrieved from the Internet: //portal.acm.org/ft_gateway.cfm!id=780738&type+pdf &coll=GUIDE*CFID=49403193&CFTOKEN=20519842>.

Andrew McNeil: "Very Simple Processor (VSP) 2—external description." Internet Document, 'Online! Jan. 8, 2002, XP002338583 Retrieved from the Internet: .andymcn.com/VSP2external.html>.

Derek Rayside, Evan Mamas, Erik Hons: "Compact Java Binaries for Embedded Systems" Proceedings of the 1999 Conference of the Centre for Advanced Studies on Collaborative Research, 'Online! 1999 XP002338017 Mississauga, Ontario, Canada Retrieved from the Internet: //porta.acm.org/ft_gateway.cfrm?id=782004 &type=pdf&coll=GUIDE&dl=GUIDE&CFID=49402360 &CFTOKEN=71919772>.

(Continued)

*Primary Examiner*—Meng-Al T. An
*Assistant Examiner*—Camquy Truong
(74) *Attorney, Agent, or Firm*—Park, Vaughan & Fleming LLP

(57) ABSTRACT

One embodiment of the present invention provides a system that facilitates performing proximity-based addressing in a platform-independent virtual machine. During execution of a program on the platform-independent virtual machine, the system receives an instruction and a parameter associated with the instruction that can be used to generate a reference to a program element associated with the instruction. Next, the system examines information encoded within the parameter to determine a proximity of the reference, and then uses the parameter to generate the reference to the program element, wherein the proximity of the reference determines how the reference is generated from the parameter.

25 Claims, 4 Drawing Sheets

OTHER PUBLICATIONS

Thomas Gettys: "The Redcode ICWS-88 Standard" Internet Document, Online! 1988, XP002338018 Retrieved from the Internet: . ams.smc.univie.ac.at/{schamane/lectures/kds2/data/icws-88.txt.

Bill Venners: "Control Flow in the Java Virtual Machine" Internet Document, 'Online! Mar. 1997, XP002338584 Retrieved from the Internet: //web.archive.org/web/20020919025026/http://www.artima.com/underthehood/flowP.html>.

* cited by examiner

PROXIMITY-BASED ADDRESSING FOR SUPPORTING IN-PLACE EXECUTION IN VIRTUAL MACHINES

BACKGROUND

1. Field of the Invention

The present invention relates to the design of platform-independent virtual machines within computer systems. More specifically, the present invention relates to a method and an apparatus for performing proximity-based addressing to support in-place execution in platform-independent virtual machines.

2. Related Art

Dramatic advances in computer technology presently make it possible to integrate a significant amount of computing power into pocket-sized computing devices, such as cell phones and personal organizers. In order to enable these devices to run a wide variety of applications, developers have begun to incorporate platform-independent virtual machines (such as the JAVA VIRTUAL MACHINE™ developed by SUN Microsystems, Inc. of Santa Clara, Calif.) into these computing devices. This enables these computing devices to execute platform-independent byte-codes, which can be easily distributed to a large number of different computing platforms.

In particular, the Java 2 Platform, Micro Edition (J2ME™) has become very popular in the wireless device space. Many key players in the wireless device industry have recently started shipping J2ME-enabled devices in high volume. It has been estimated that 60-80 million J2ME-enabled mobile phones were shipped in 2002, and the total number of J2ME devices shipped in 2003 is likely to exceed 200 million. In spite of the success of the J2ME platform, significant challenges for JAVA™ technology remain in the small device space.

One area that is becoming a big bottleneck for serious J2ME application development is—not surprisingly—application size. With the deployment of more significant J2ME applications in mobile devices, J2ME application downloads consume an increasingly larger amount of wireless network bandwidth. Also, the runtime dynamic memory costs and application startup costs associated with anything but very small J2ME applications are still excessive for most mass-market consumer devices, as well as for serious mobile systems software development in the Java programming language.

One of the most promising approaches reducing the memory usage and application startup costs in platform-independent virtual machines is a technique known as "in-place execution." In a Java Virtual Machine (JVM) that supports pure in-place execution, the standard Java class file format is replaced with a representation that can be used directly as runtime structures for the virtual machine, without the conventional, costly class loading process. In this representation, static data structures, such as classes, method tables, field tables, exception handlers, symbols, constants and byte codes, are never actually loaded into the virtual machine, but are instead accessed directly from the static representation. In mobile devices, where the static representation can be kept in cheap flash or read-only memory, this can imply dramatic RAM consumption savings; up to 5-10× in common situations. The static size of applications can also be significantly smaller than with regular Java class files or JAR files, without any loss of symbolic information or dynamic linkability of Java applications.

Unfortunately, in-place execution has a number of disadvantages when it comes to execution speed. Since in-place executable code is immutable, various commonly used runtime optimizations that depend on the ability to modify bytecodes at runtime cannot be used. Also, since in-place executable files are intended to be easily relocatable in memory, all references in such files must be offsets rather than pointers. This introduces an additional level of indirection at runtime, which slows down execution speed.

Additionally, since in-place executable files are generally intended to be applicable to a broad number of virtual machine implementations, they cannot be customized for particular virtual machine implementations like the run-time data structures that are used in conventional virtual machines.

Because of these problems, in-place execution has not been widely used in platform-independent virtual machines, even though such technology would otherwise be ideal for mobile phones and other target devices.

Hence, what is needed is a method and an apparatus that facilitates efficiently performing in-place execution in platform-independent virtual machines.

SUMMARY

One embodiment of the present invention provides a system that facilitates performing proximity-based addressing in a platform-independent virtual machine. During execution of a program on the platform-independent virtual machine, the system receives an instruction and a parameter associated with the instruction that can be used to generate a reference to a program element associated with the instruction. Next, the system examines information encoded within the parameter to determine a proximity of the reference, and then uses the parameter to generate the reference to the program element, wherein the proximity of the reference determines how the reference is generated from the parameter.

In a variation on this embodiment, the proximity of the reference can indicate that: the program element is located in the same class; the program element is associated with another class in the same bundle; or the program element is associated with another class in another bundle.

In a variation on this embodiment, if the program element is a field or a method, and if the proximity of the reference indicates that the program element is located in the same class, generating the reference involves using the parameter as an offset for the program element within the same class.

In a variation on this embodiment, if the program element is a field or a method, and if the proximity of the reference indicates that the program element is located in another class in the same bundle, generating the reference involves using the parameter to lookup an entry in a reference lookup structure, wherein the entry contains a global offset for the class, and an offset for the program element within the class.

In a variation on this embodiment, if the program element is a field or a method, and if the proximity of the reference indicates that the program element is located in another class in another bundle, generating the reference involves using the parameter to lookup an entry in a reference lookup structure, wherein the entry identifies a class name, a program element name and a program element type. Next, the system uses the class name to lookup a global offset for the class, and uses the program element name and the program element type to look up an offset for the program element within the class.

In a variation on this embodiment, if the program element is a class, and if the proximity of the reference indicates that the class is located in the same bundle, generating the reference involves using the parameter to lookup an entry in a reference lookup structure, wherein the entry contains a global offset for the class.

In a variation on this embodiment, if the program element is a lass, and if the proximity of the reference indicates that the class is located in another bundle, generating the reference involves using the parameter to lookup an entry in a reference lookup structure, wherein the entry identifies a class name. Next, the system uses the class name to lookup a global offset for the class.

In a variation on this embodiment, prior to execution of the program, the system produces a reference lookup structure to facilitate generating references to program elements during in-place execution. In a further variation, the reference lookup structure includes, a reference table for generating references to methods or fields, and an offset map for generating references to classes.

In a variation on this embodiment, the information encoded within the parameter is contained in reserved bits, which comprise the two lowest-order bits of the parameter.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Executing a Platform-Independent Application on a Computing Device

Figure 1:
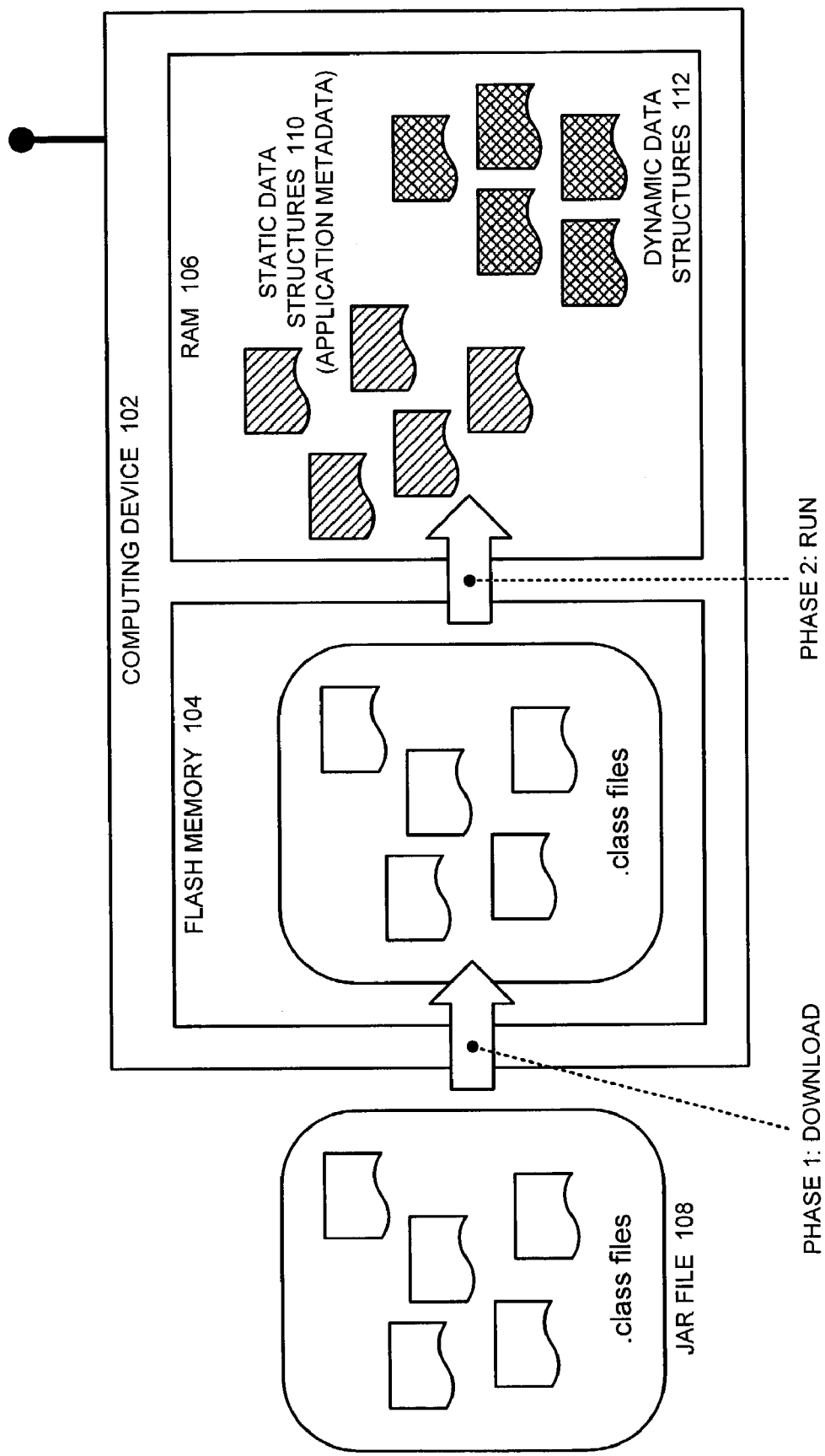
FIG. 1 illustrates the execution of a platform-independent application on a computing device.

FIG. 1 illustrates conventional execution of a platform-independent application on a computing device 102. Computing device 102 can generally include any type of device or system with computational capabilities, including, but not limited to, a laptop computer system, a pocket-sized computer system, a personal organizer or a device controller. Computing device 102 can also include a computing device that is embedded within another device, such as a pager, a cell phone, a television, an automobile, or an appliance. In one embodiment of the present invention, computing device 102 includes a wireless transceiver for sending and receiving signals across a wireless network.

During operation, computing device 102 can receive a platform-independent application. For example, referring to FIG. 1 computing device 102 receives a platform-independent application contained in a Java ARchive file (JAR file) 108, or in some other equivalent file format. The application within JAR file 108 is made up of a number of class files and other data structures.

JAR file 108 is loaded into non-volatile flash memory 104 (or read-only memory) within computing device 102. This loading process can take place over a wireless or a wired communication link, or by introduction of a computer-readable storage medium, such as a disk, containing JAR file 204 into computing device 102.

Next, in order to execute the application, a time-consuming class loading process takes place in which static data structures 110 (application metadata) are copied from flash memory 104 into random access memory (RAM) 106. These static data structures 110 includes items, such as classes, field and method tables, symbols, exception handler tables, constants and bytecodes. Additionally, dynamic data structures 112 associated with the application (such as object instances, execution stacks, threads and monitors) are stored in RAM 106. The application can then be executed in RAM 106.

Note that the time-consuming process of copying static data structures 110 and code into RAM 106 is largely unnecessary because it is possible to access the static data structures 110 and code directly from flash memory 104.

In-Place Execution of a Platform-Independent Application

Figure 2:
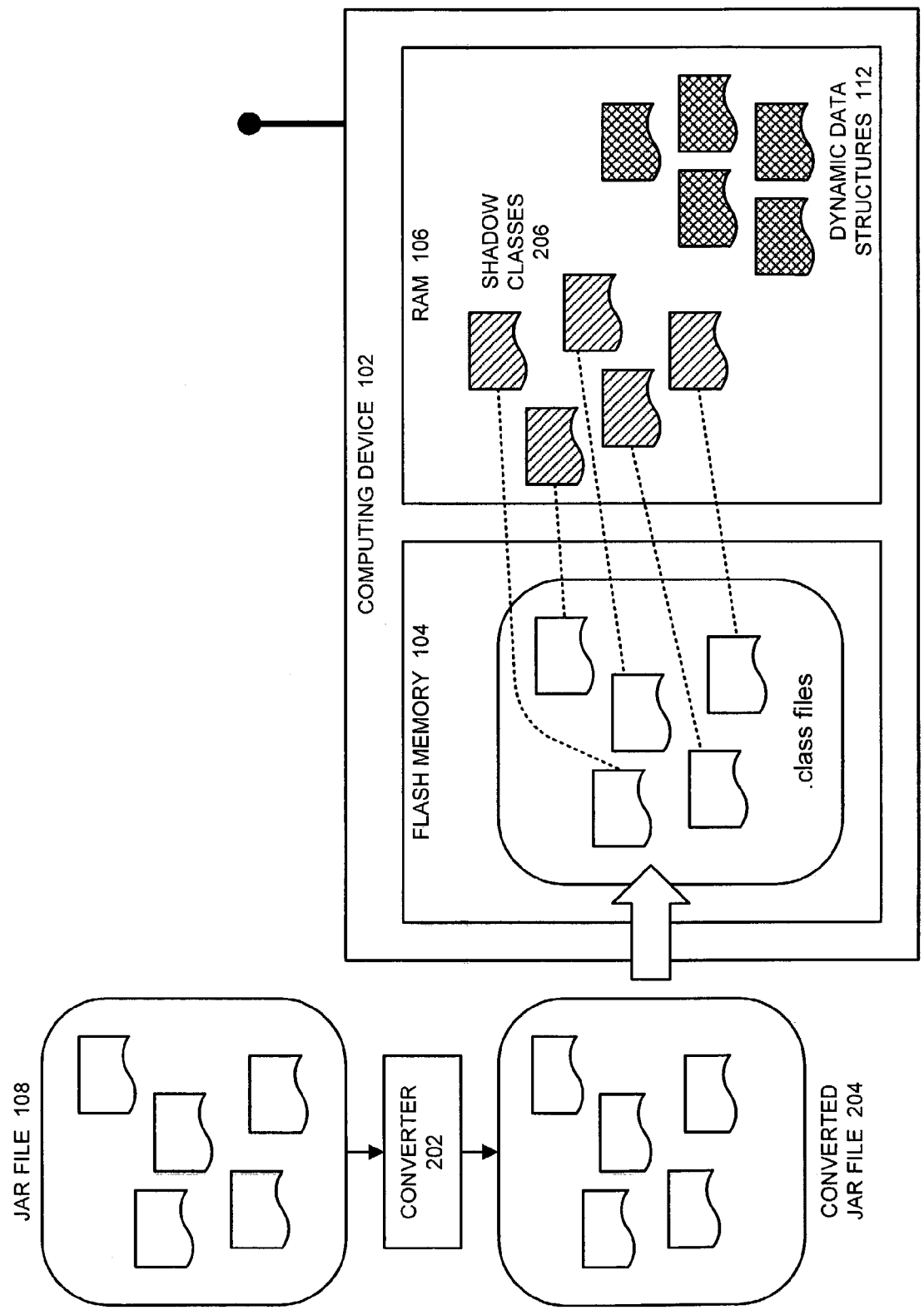
FIG. 2 illustrates in-place execution of a platform-independent application on a computing device in accordance with an embodiment of the present invention.

FIG. 2 illustrates in-place execution of a platform-independent application on computing device 102 in accordance with an embodiment of the present invention. In this embodiment, a converter 202 processes JAR file 108 to produce a converted JAR file 204. Within converted JAR file 108, all static data structures of the application (application metadata) are represented in directly executable form.

Next, converted JAR file 108 is loaded in flash memory 104 within computing device 102. When the application is subsequently executed, the static data structures stay within flash memory 104. Only small "shadow classes" 206, which act as placeholders for static variables, are stored in RAM 106 along with dynamic data structures 112.

Bytecode Format

During the above-described conversion process, pointers are replaced by offsets to allow the application to be relocated in memory. During this conversion process, the bytecode format is largely unchanged. Note that it is possible to change the bytecode format to support offset-based addressing. However, modifying the bytecode format makes it hard if not impossible to use existing debugging tools. Hence, it is desirable to preserve the bytecode format (and in particular the lengths of bytecodes) when performing the conversion.

A bytecode is often associated with a parameter, which can be used to determine the location of a program element (such as a method, a field or a class) associated with the bytecode. During the conversion process, parameters containing pointers are converted into either offsets or symbolic links.

Figure 3:
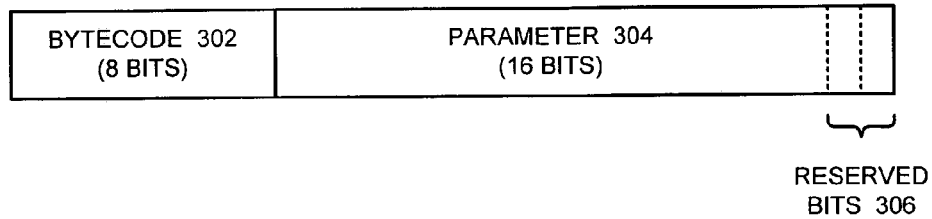
FIG. 3 illustrates a bytecode and an associated parameter.

Reserved bits in the bytecode are used to specify how a reference to the program element is to be generated from the parameter. For example, referring to FIG. 3, an 8-bit bytecode 302 is associated with an adjacent 16-bit parameter 304. The two lower-order two bits of parameter 304 function as reserved bits 306, which specify how the reference to the program element is to be generated from the parameter as is described in more below with reference to FIGS. 4-5.

Lookup Structures to Support Offset-Based Addressing

Figure 4:
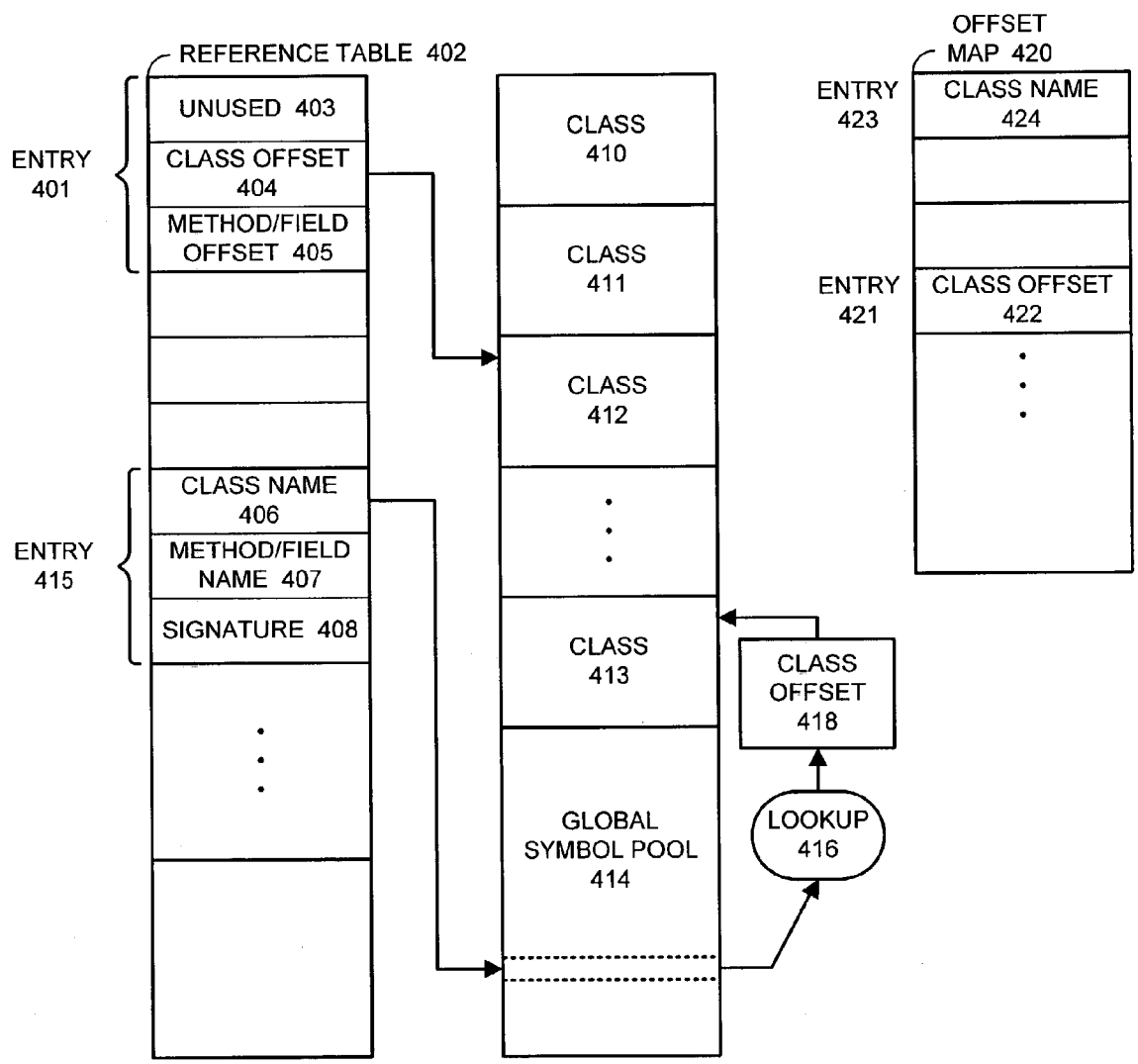
FIG. 4 illustrates lookup structures that facilitate using offset-based references in accordance with an embodiment of the present invention.

Parameter 304 is used to reference one or more lookup structures containing offsets or symbolic links. For example, FIG. 4 depicts lookup structures that facilitate offset-based references in accordance with an embodiment of the present invention. These lookup structures include reference table 402 and offset map 420.

Figure 5:
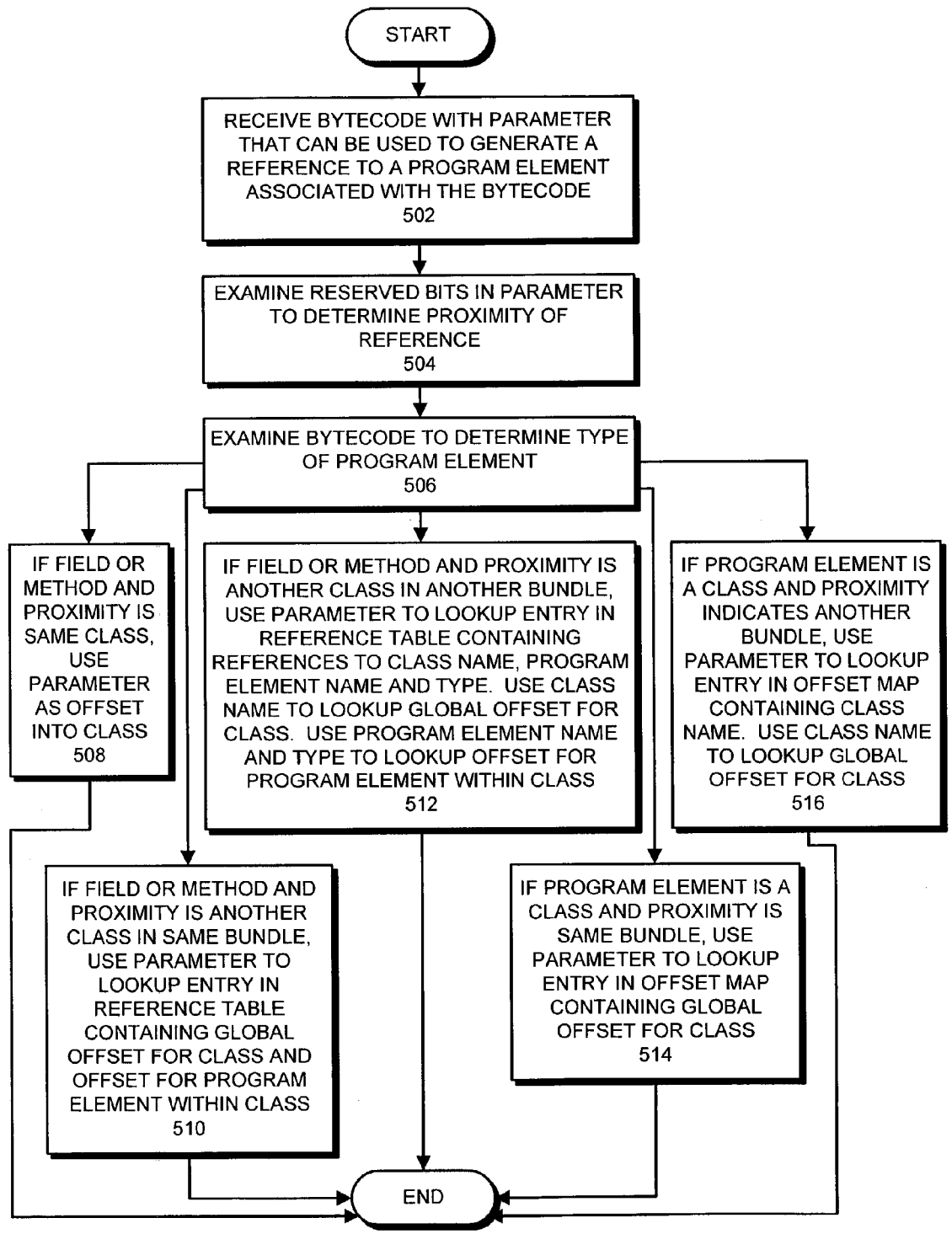
FIG. 5 presents a flow chart illustrating the proximity-based addressing process in accordance with an embodiment of the present invention.

Referring to the flow chart in FIG. 5, reference table 402 and offset map 420 are used as follows. During execution of a platform-independent application, a platform-independent virtual machine receives a bytecode 302 along with an associated parameter 304 that can be used to generate a reference to a program element associated with bytecode 302 (step 502).

Next, the system examines reserved bits 306 within parameter 304 to determine the proximity of the reference (step 504). The system also examines the bytecode to determine the type of the program element (field, method, class) (step 506). Next, the system performs a number of actions depending on the type of the program element and the proximity of the reference.

If the program element is a field or a method and if the proximity of the reference is the same class (indicated by reserved bits 00), parameter 304 is used as an offset into the class, and no lookup is required (step 508).

If the program element is a field or a method and if the proximity of the reference is to another class in the same bundle (indicated by reserved bits 01), parameter 304 is used to lookup an entry 401 in reference table 402. (Note that this lookup, as well as other lookups in reference table 402 and offset map 420, may involve masking out reserved bits 306.) Entry 401 contains an unused 32-bit word 403, a global 32-bit class offset 404 for a corresponding class 412, and a 16-bit field/method offset 405, which specifies an offset for the field or method within class 412 (step 510).

If the program element is a field or a method and if the proximity of the reference is to another class in another bundle (indicated by reserved bits 10), parameter 304 is used to lookup an entry 415 in reference table 402. Entry 415 contains a class name offset 406, a field/method name offset 407 and a signature 408. Class name offset 406 is used to lookup a class name in global symbol pool 414. This class name is used to perform a system lookup 416, which returns a global 32-bit class offset 418 for a corresponding class 413. Field/method name offset 407 is similarly used to lookup a field/method name in global symbol pool 414. This field/method name along with signature 408 are used to perform a system lookup, which returns a 16-bit offset for the field/method within class 413 (step 512).

If the program element is a class and if the proximity of the reference is the same bundle or file (indicated by reserved bits 01), parameter 304 is used to lookup an entry 421 in offset map 420, wherein entry 421 contains a 32-bit global class offset 422 for a corresponding class (step 514).

If the program element is a class and if the proximity of the reference is another bundle or file (indicated by reserved bits 10), parameter 304 is used to lookup an entry 423 in offset map 420. Entry 423 contains a class name offset 424, which is used to lookup a class name in global symbol pool 414. This class name is used to perform a system lookup, which returns a 32-bit global class offset for a corresponding class (step 516).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing proximity-based addressing in a platform-independent virtual machine, comprising:
   prior to execution of a program, converting an instruction in the program to support proximity-based addressing;
   receiving the instruction during execution of the program on the platform-independent virtual machine;
   receiving a parameter associated with the instruction that can be used to generate a reference to a program element associated with the instruction;
   examining information encoded within the parameter to determine a proximity of the reference; and
   using the parameter to generate the reference to the program element, wherein the proximity of the reference determines how the reference is generated from the parameter;
   wherein converting the instruction to support proximity-based addressing enables executing the program in-place, thereby reducing memory usage and program overhead
   wherein the proximity of the reference can indicate that:
      the program element is located in the same class as the instruction;
      the program element is associated with another class in the same bundle as the instruction; or
      the program element is associated with another class in another bundle than the bundle that includes the instruction; and
   wherein if the program element is a field or a method, and if the proximity of the reference indicates that the program element is located in another class in another bundle, generating the reference involves:
      using the parameter to lookup an entry in a reference lookup structure, wherein the entry identifies a class name, a program element name and a program element type;
      using the class name to lookup a global offset for the class; and
      using the program element name and the program element type to look up an offset for the program element within the class.

2. The method of claim 1, wherein if the program element is a field or a method, and if the proximity of the reference indicates that the program element is located in the same class, generating the reference involves:

using the parameter as an offset for the program element within the same class.

3. The method of claim 1, wherein if the program element is a field or a method, and if the proximity of the reference indicates that the program element is located in another class in the same bundle, generating the reference involves:
   using the parameter to lookup an entry in a reference lookup structure, wherein the entry contains a global offset for the class, and an offset for the program element within the class.

4. The method of claim 1, wherein if the program element is a class, and if the proximity of the reference indicates that the class is located in the same bundle, generating the reference involves:
   using the parameter to lookup an entry in a reference lookup structure, wherein the entry contains a global offset for the class.

5. The method of claim 1, wherein if the program element is a class, and if the proximity of the reference indicates that the class is located in another bundle, generating the reference involves:
   using the parameter to lookup an entry in a reference lookup structure, wherein the entry identifies a class name; and
   using the class name to lookup a global offset for the class.

6. The method of claim 1, wherein prior to execution of the program, the method further comprises producing a reference lookup structure to facilitate generating references to program elements during in-place execution.

7. The method of claim 6, wherein the reference lookup structure includes:
   a reference table for generating references to methods or fields; and
   an offset map for generating references to classes.

8. The method of claim 1, wherein the information encoded within the parameter is contained in reserved bits, wherein the reserved bits are the two lowest-order bits of the parameter.

9. A computer-readable storage medium storing instructions that when executed by a computer cause the computer to perform a method for performing proximity-based addressing in a platform-independent virtual machine, the method comprising:
   prior to execution of a program, converting an instruction in the program to support proximity-based addressing;
   receiving the instruction during execution of the program on the platform-independent virtual machine;
   receiving a parameter associated with the instruction that can be used to generate a reference to a program element associated with the instruction;
   examining information encoded within the parameter to determine a proximity of the reference; and
   using the parameter to generate the reference to the program element, wherein the proximity of the reference determines how the reference is generated from the parameter; wherein converting the instruction to support proximity-based addressing enables executing the program in-place, thereby reducing memory usage and program overhead;
   wherein the proximity of the reference can indicate that:
      the program element is located in the same class as the instruction;
      the program element is associated with another class in the same bundle as the instruction; or
      the program element is associated with another class in another bundle than the bundle that includes the instruction;
   wherein if the program element is a field or a method, and if the proximity of the reference indicates that the program element is located in another class in another bundle, generating the reference involves:
      using the parameter to lookup an entry in a reference lookup structure, wherein the entry identifies a class name, a program element name and a program element type;
      using the class name to lookup a global offset for the class; and
      using the program element name and the program element type to look up an offset for the program element within the class.

10. The computer-readable storage medium of claim 9, wherein if the program element is a field or a method, and if the proximity of the reference indicates that the program element is located in the same class, generating the reference involves:
   using the parameter as an offset for the program element within the same class.

11. The computer-readable storage medium of claim 9, wherein if the program element is a field or a method, and if the proximity of the reference indicates that the program element is located in another class in the same bundle, generating the reference involves:
   using the parameter to lookup an entry in a reference lookup structure, wherein the entry contains a global offset for the class, and an offset for the program element within the class.

12. The computer-readable storage medium of claim 9, wherein if the program element is a class, and if the proximity of the reference indicates that the class is located in the same bundle, generating the reference involves:
   using the parameter to lookup an entry in a reference lookup structure, wherein the entry contains a global offset for the class.

13. The computer-readable storage medium of claim 9, wherein if the program element is a class, and if the proximity of the reference indicates that the class is located in another bundle, generating the reference involves:
   using the parameter to lookup an entry in a reference lookup structure, wherein the entry identifies a class name; and
   using the class name to lookup a global offset for the class.

14. The computer-readable storage medium of claim 9, wherein prior to execution of the program, the method further comprises producing a reference lookup structure to facilitate generating references to program elements during in-place execution.

15. The computer-readable storage medium of claim 14, wherein the reference lookup structure includes:
   a reference table for generating references to methods or fields; and
   an offset map for generating references to classes.

16. The computer-readable storage medium of claim 9, wherein the information encoded within the parameter is contained in reserved bits, wherein the reserved bits are the two lowest-order bits of the parameter.

17. An apparatus for performing proximity-based addressing in a platform-independent virtual machine, comprising:
   a converting mechanism configured to convert an instruction in a platform-independent program to support proximity-based addressing prior to execution of the platform-independent program;
   a platform-independent virtual machine configured to execute the platform-independent program;

a receiving mechanism within the platform-independent virtual machine configured to receive,
the instruction, and
a parameter associated with the instruction that can be used to generate a reference to a program element associated with the instruction; and
a reference generation mechanism configured to,
examine information encoded within the parameter to determine a proximity of the reference, and to
use the parameter to generate the reference to the program element, wherein the proximity of the reference determines how the reference is generated from the parameter;
wherein converting the instruction to support proximity-based addressing enables executing the platform-independent program in-place, thereby reducing memory usage and program overhead;
wherein the proximity of the reference can indicate that;
the program element is located in the same class as the instruction;
the program element is associated with another class in the same bundle as the instruction; or
the program element is associated with another class in another bundle than the bundle the includes the instruction; and
wherein if the program element is a field or a method, and if the proximity of the reference indicates that the program element is located in another class in another bundle, the reference generation mechanism is configured to;
use the parameter to lookup an entry in a reference lookup structure, wherein the entry identifies a class name, a program element name and a program element type;
use the class name to lookup a global offset for the class; and to use the program element name and the program element type to look up an offset for the program element within the class.

18. The apparatus of claim 17, wherein if the program element is a field or a method, and if the proximity of the reference indicates that the program element is located in the same class, the reference generation mechanism is configured to:
use the parameter as an offset for the program element within the same class.

19. The apparatus of claim 17, wherein if the program element is a field or a method, and if the proximity of the reference indicates that the program element is located in another class in the same bundle, the reference generation mechanism is configured to:
use the parameter to lookup an entry in a reference lookup structure, wherein the entry contains a global offset for the class, and an offset for the program element within the class.

20. The apparatus of claim 17, wherein if the program element is a class, and if the proximity of the reference indicates that the class is located in the same bundle, the reference generation mechanism is configured to:
use the parameter to lookup an entry in a reference lookup structure, wherein the entry contains a global offset for the class.

21. The apparatus of claim 17, wherein if the program element is a class, and if the proximity of the reference indicates that the class is located in another bundle, the reference generation mechanism is configured to:
use the parameter to lookup an entry in a reference lookup structure, wherein the entry identifies a class name; and to
use the class name to lookup a global offset for the class.

22. The apparatus of claim 17, further comprising a converter configured to convert the platform-independent program into a form suitable for in-place execution;
wherein prior to execution of the platform-independent program, the converter is configured to produce a reference lookup structure to facilitate generating references to program elements during in-place execution.

23. The apparatus of claim 22, wherein the reference lookup structure includes:
a reference table for generating references to methods or fields; and
an offset map for generating references to classes.

24. The apparatus of claim 17, wherein the information encoded within the parameter is contained in reserved bits, wherein the reserved bits are the two lowest-order bits of the parameter.

25. A means for performing proximity-based addressing in a platform-independent virtual machine, comprising:
a converting means for converting an instruction in a program to support proximity-based addressing prior to execution of the program;
a receiving means within the platform-independent virtual machine configured to receive,
the instruction, and
a parameter associated with the instruction that can be used to generate a reference to a program element associated with the instruction; and
a reference generation means within the platform-independent virtual machine configured to,
examine information encoded within the parameter to determine a proximity of the reference, and to
use the parameter to generate the reference to the program element, wherein the proximity of the reference determines how the reference is generated from the parameter;
wherein converting the instruction to support proximity-based addressing enables executing the program in-place, thereby reducing memory usage and program overhead;
wherein the proximity of the reference can indicate that:
the program element is located in the same class as the instruction;
the program element is associated with another class in the same bundle as the instruction; or
the program element is associated with another class in another bundle than the bundle the includes the instruction; and
wherein if the program element is a field or a method, and if the proximity of the reference indicates that the program element is located in another class in another bundle, the reference generation mechanism is configured to:
use the parameter to lookup an entry in a reference lookup structure, wherein the entry identifies a class name, a program element name and a program element type;
use the class name to lookup a global offset for the class; and to
use the program element name and the program element type to look up an offset for the program element within the class.

* * * * *